United States Patent
Berliner et al.

(10) Patent No.: US 11,671,976 B2
(45) Date of Patent: Jun. 6, 2023

(54) EARLY NOTIFICATION FOR TRANSMISSION OF ENCODED VIDEO DATA

(71) Applicant: QUALCOMM Incorporated, San Diego, CA (US)

(72) Inventors: Ran Berliner, Kfar-Aviv (IL); Roman Budilovsky, Lod (IL); Yehonatan Dallal, Kfar Saba (IL); Shay Landis, Hod Hasharon (IL); Assaf Touboul, Netanya (IL)

(73) Assignee: QUALCOMM INCORPORATED, San Diego, CA (US)

( * ) Notice: Subject to any disclaimer, the term of this patent is extended or adjusted under 35 U.S.C. 154(b) by 260 days.

(21) Appl. No.: 17/066,120

(22) Filed: Oct. 8, 2020

(65) Prior Publication Data
US 2022/0116984 A1    Apr. 14, 2022

(51) Int. Cl.
| | |
|---|---|
| *H04W 72/14* | (2009.01) |
| *H04W 72/23* | (2023.01) |
| *H04N 19/177* | (2014.01) |
| *H04N 19/146* | (2014.01) |
| *H04N 19/172* | (2014.01) |
| *H04W 72/52* | (2023.01) |

(52) U.S. Cl.
CPC ......... *H04W 72/23* (2023.01); *H04N 19/146* (2014.11); *H04N 19/172* (2014.11); *H04N 19/177* (2014.11); *H04W 72/52* (2023.01)

(58) Field of Classification Search
CPC .. H04N 19/146; H04N 19/172; H04N 19/177; H04W 72/1252; H04W 72/14
See application file for complete search history.

(56) References Cited

U.S. PATENT DOCUMENTS

| | | | |
|---|---|---|---|
| 10,116,712 B2 | 10/2018 | Ma et al. | |
| 11,202,198 B1 * | 12/2021 | Newman | ........... H04W 72/1242 |
| 11,368,243 B2 * | 6/2022 | Zhang | ................... H04L 1/0007 |
| 2016/0056927 A1 | 2/2016 | Liu et al. | |

(Continued)

FOREIGN PATENT DOCUMENTS

WO    2017196380 A1    11/2017

OTHER PUBLICATIONS

ITU-T H.264, Series H: Audiovisual and Multimedia Systems, Infrastructure of audiovisual services—Coding of moving video. Advanced video coding for generic audiovisual services, The International Telecommunication Union. Jun. 2011, 674 Pages.

(Continued)

*Primary Examiner* — Phuc H Tran
(74) *Attorney, Agent, or Firm* — Shumaker & Sieffert, P.A.

(57) ABSTRACT

A device generates an estimated size of encoded versions of one or more pictures of video data prior to generating the encoded versions of the one or more pictures. A physical layer of a radio system of the device is configured to send a message to a wireless base station. The message indicates a size value based on the estimated size of the encoded versions of the one or more pictures. The physical layer of the radio system receives an uplink grant notification in response to the message. Based on the uplink grant notification, the physical layer of the radio system sends packets to the wireless base station containing the encoded versions of the one or more pictures.

22 Claims, 4 Drawing Sheets

(56) References Cited

U.S. PATENT DOCUMENTS

2017/0353885 A1* 12/2017 Perraud ................ H04L 65/762
2020/0145904 A1   5/2020 Kim et al.

OTHER PUBLICATIONS

ITU-T H.265, Series H: Audiovisual and Multimedia Systems, Infiastructure of Audiovisual Services—Coding of Moving Video, High Efficiency Video Coding, The International Telecommunication Union, Jun. 2019, 696 Pages.

Chen J., et al., "Algorithm Description of Joint Exploration Test Model 1," 1. JVET Meeting, Oct. 19-21, 2015, Geneva (The Joint Video Exploration Team of ISO/IEC JTC1/SC29/WG11 and ITU-T SG.16 ), URL: http://phenix.int-evry.fr/jvet/, No. JVET-A1001, Feb. 24, 2016 (Feb. 24, 2016), XP030150000, 27 Pages.

* cited by examiner

EARLY NOTIFICATION FOR TRANSMISSION OF ENCODED VIDEO DATA

TECHNICAL FIELD

This disclosure relates to transmission of encoded video data.

BACKGROUND

The ability to send and receive high-quality video data is one of the compelling use-cases for deployment of advanced wireless networks. For example, Fifth Generation (5G) wireless networks and beyond may enable streaming of high-quality video of live events, teleconferencing, and so on. In some instances, a user device may encode video data and then use a radio system to transmit the encoded video data to a wireless base station. The wireless base station, in turn, may route the encoded video data through a network, such as the Internet, to a destination device.

SUMMARY

In general, this disclosure describes techniques for transmitting video data on a wireless network. As described herein, a device may generate an estimated size of encoded versions of one or more pictures of video data prior to generating (e.g., prior to encoding) the encoded versions of the one or more pictures. A physical layer of a radio system of the device is configured to send a message, such as a Buffer Status Report (BSR), to a wireless base station. The message may be an implicit or explicit request for resources to transmit data to the wireless base station. The message indicates a size value based on the estimated size of the encoded versions of the one or more pictures. The physical layer of the radio system receives an uplink grant notification in response to the message. Based on the uplink grant notification, the physical layer of the radio system sends packets to the wireless base station containing the encoded versions of the one or more pictures.

In one example, this disclosure describes a method of transmitting encoded video data, the method includes generating an estimated size of encoded versions of one or more pictures of video data prior to generating the encoded versions of the one or more pictures; sending, by a physical layer of a radio system, a message to a wireless base station, wherein the message indicates a size value based on the estimated size of the encoded versions of the one or more pictures; receiving, by the physical layer of the radio system, an uplink grant notification in response to the message; and based on the uplink grant notification, sending, by the physical layer of the radio system to the wireless base station, packets containing the encoded versions of the one or more pictures.

In another example, this disclosure describes a device comprising: one or more processors implemented in circuitry, the one or more processors configured to generate an estimated size of encoded versions of one or more pictures of video data prior to generating the encoded versions of the one or more pictures; and a radio system that comprises a physical layer configured to: send a message to a wireless base station, wherein the message indicates a size value based on the estimated size of the encoded versions of the one or more pictures; receive an uplink grant notification in response to the message; and based on the uplink grant notification, send, to the wireless base station, packets containing the encoded versions of the one or more pictures.

In another example, this disclosure describes a computer-readable storage medium having stored thereon instructions that, when executed, configure a processor to: generate an estimated size of encoded versions of one or more pictures of video data prior to generating the encoded versions of the one or more pictures; cause a physical layer of a radio system to: send a message to a wireless base station, wherein the message indicates a size value based on the estimated size of the encoded versions of the one or more pictures; receive an uplink grant notification in response to the message; and based on the uplink grant notification, send, to the wireless base station, packets containing the encoded versions of the one or more pictures.

In another example, this disclosure describes a device for transmitting encoded video data, the device includes means for generating an estimated size of encoded versions of one or more pictures of video data prior to generating the encoded versions of the one or more pictures; means for sending a message to a wireless base station, wherein the message indicates a size value based on the estimated size of the encoded versions of the one or more pictures; means for receiving an uplink grant notification in response to the message; and means for sending, based on the uplink grant notification, to the wireless base station, packets containing the encoded versions of the one or more pictures.

The details of one or more examples are set forth in the accompanying drawings and the description below. Other features, objects, and advantages will be apparent from the description, drawings, and claims.

DETAILED DESCRIPTION

Figure 1:
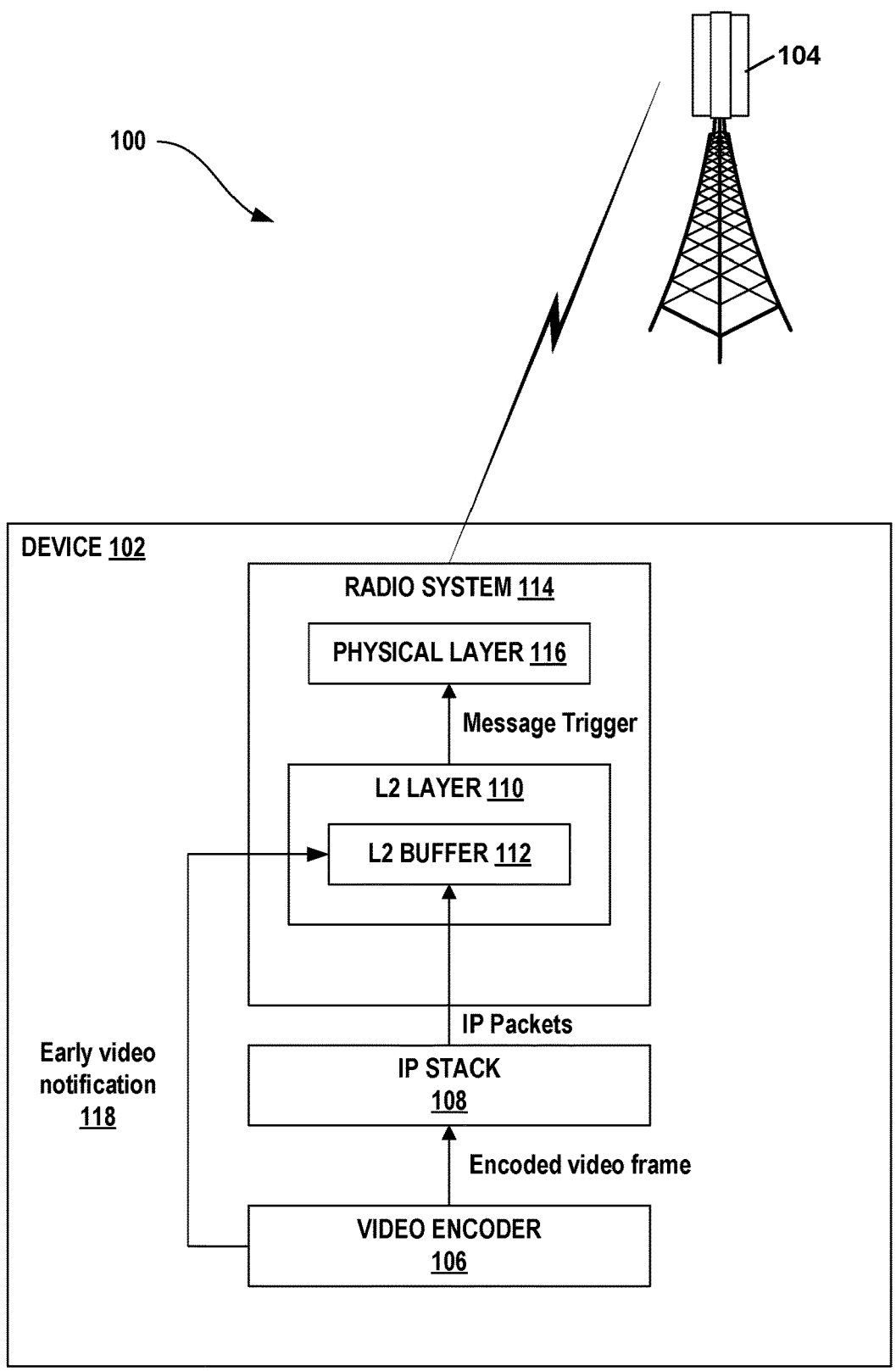
FIG. 1 is a block diagram illustrating an example system configured in accordance with one or more techniques of this disclosure.

The ability to transmit high-quality video is one of the most compelling features of advanced wireless communication networks. Devices configured to use advanced wireless communication networks may include video encoders that encode video data according to a codec, such as the ITU-T H.265/High Efficiency Video Coding (HEVC) standard, the emerging ITU-T H.266/Versatile Video Coding (VVC) standard, Essential Video Coding (EVC), AOMedia Video 1 (AV1) codec, and so on. A device may encapsulate the encoded video data in packets, such as Internet Protocol (IP) packets, that are stored in a Layer 2 (L2) buffer for transmission on a radio system of the device. The L2 buffer may correspond to the Media Access Control (MAC) layer of the Open System Interconnection (OSI) model.

When the device stores packets in the L2 buffer, an L2 layer of the device generates a message, such as a Buffer Status Report (BSR) or other type of message. In response to the message, a physical layer of the radio system wirelessly communicates with a wireless base station to request allocation of time slots for transmission of the packets from the device. Upon receiving a grant of time slots for transmission of the packets, the physical layer transmits the packets to the wireless base station. The time between when packets containing encoded video data are ready to be sent and the time when the physical layer is able to send the packets may be referred to as the uplink (UL) latency.

Because applications and devices other than the video encoder may be competing for timeslots, the UL latency may be variable. Variability of the UL latency may take the form of jitter that reduces video quality as perceived by a device receiving the encoded video data. For instance, jitter may cause encoded video data to arrive late or may cause too much encoded video data to arrive at once. This may result in buffer underflow or overflow conditions which may cause individual pictures or whole sequences of pictures to be lost or corrupted. Avoiding such buffer underflow and overflow conditions may be especially important in latency-sensitive and/or real-time applications and services such as augmented reality (AR), extended reality, remote surgery, security services, and so on.

The disclosure describes techniques that may address one or more of these issues by, for example, reducing end-to-end packet delays thereby reducing the probability for buffer overflows in the transmit path and buffer underflows within, for example, video decoder buffers. As described herein, instead of the device waiting until there are packets stored in the L2 buffer to generate the message, a video encoder of the device may provide an "early" video notification, e.g., to the L2 layer. The early video notification includes signaling that provides an indication (or notice) to the L2 layer that video packets will be or are expected to be processed for transmission. In some examples, the early video notification may indicate a size value based on an estimated size of the encoded versions of the pictures. In some examples, the early video notification may indicate a number of an expected number of video packets to be transmitted. The L2 layer generates a message, such as a BSR or other type of message, in response to the early video notification, which prompts a physical layer to send the message to a wireless base station. While waiting to receive a grant of timeslots from the wireless base station, the device may store (or continue to store) packets containing the encoded versions of the pictures in the L2 buffer and may therefore be ready to be sent when a time corresponding to the granted timeslots arrives. In this way, the techniques of this disclosure may reduce UL latency when sending encoded video data. Reducing UL latency may improve video quality experience due to lower video packet latency and lower packet delay variability. Moreover, because of reduced UL latency when sending encoded video data, the probability of buffer overflow of the L2 buffer may be reduced.

FIG. 1 is a block diagram illustrating an example system 100 configured in accordance with one or more techniques of this disclosure. In the example of FIG. 1, system 100 includes a device 102 and a wireless base station 104.

Device 102 is configured to wirelessly communicate with wireless base station 104. Device 102 may be or may include various types of devices. For example, device 102 may be or may include a mobile device (e.g., a mobile phone, tablet computer, laptop computer, wearable device, etc.). In some examples, device 102 may be or may include a desktop computer, a wireless receiver device, a media streamer device, a video gaming device, an Internet of Things (IoT) device, a vehicle, and so on.

Wireless base station 104 may be a wireless access point. Although the example of FIG. 1 shows wireless base station 104 as being mounted on a pylon, the techniques of this disclosure are not so limited. In some examples, wireless base station 104 is a Fifth Generation (5G) base station.

In the example of FIG. 1, device 102 includes a video encoder 106, an Internet Protocol (IP) stack 108, and a radio system 114. Radio system 114 includes a physical layer 2 (L2) module 110 and a physical layer 116. Layer 2 module (L2) module 110 includes an L2 buffer 112. The L2 layer in combination with radio system 114 (which may serve as a Layer 1), may be referred to as a communication layer.

Video encoder 106 is configured to encode video data. Video encoder 106 may encode the video data according to one of a variety of different video encoding standards, such as H.264/Advanced Video Coding (AVC), H.265/High Efficiency Video Coding (HEVC), H.266/Versatile Video Coding (VVC), Essential Video Coding (EVC), AOMedia Video 1 (AV1) codec, and so on. Video encoder 106 may obtain the video data from one or more sources. Such sources may include video cameras, graphics engines, stored video data, and so on.

IP stack 108 is configured to generate IP packets that encapsulate video data encoded by video encoder 106. In other words, IP packets generated by IP stack 108 have payloads that contain encoded video data. Although this disclosure is primarily described with respect to IP packets, other protocols may be used instead of IP in other examples. In some examples, the IP packets may contain Real-time Transport Protocol (RTP) protocol packets. In some examples, for a communication layer point of view, every video frame period, e.g., video with 60 frames per second (fps) produces a video frame every $\frac{1}{60}=16.66$ msec. Thus, a burst of IP packets may be delivered from the multimedia application to the communication layer for an uplink transmission.

L2 buffer 112 temporarily stores the IP packets generated by IP stack 108. L2 buffer 112 is so named because L2 buffer 112 corresponds to layer 2 (data link layer) of the OSI model and in the 3GPP specifications, such as 5G, 4G, etc. Packets are stored in L2 buffer 112 prior to transmission by radio system 114.

Radio system 114 is configured to wirelessly send and receive data. As shown in the example of FIG. 1, radio system 114 includes physical layer hardware 116. Physical layer hardware 116 may comprise programmable- and/or fixed-function circuitry, such as processors or other types of circuitry. For concision, this disclosure may refer physical layer hardware 116 as physical layer 116. Physical layer 116 may be configured to manage transmission of data at layer 1 (physical layer) of the OSI model. Although not shown for purposes of simplicity, radio system 114 may include other components, such as transmit circuitry, receive circuitry, and one or more antennas.

The video data encoded by video encoder 106 may include a series of pictures, which may also be referred to as "frames." Video encoder 106 may divide the series of pictures into groups of pictures (GOPs). Thus, each GOP may include a different sequence of pictures in the series of pictures. In general, video encoder 106 encodes a first picture in a GOP as an I-frame. An I-frame is a picture that can be decoded without reference to other pictures, either within the GOP or outside the GOP. Thus, an I-frame may be used as place from which decoding can begin after the beginning of the video data. Video encoder 106 may schedule I-frames on a recurring or dynamic basis.

Video encoder 106 may encode other pictures in a GOP as P- or B-frames. P-frames are pictures that are dependent on one other picture in the GOP. B-frames are pictures that are dependent on two or more other pictures in the GOP. Because P- and B-frames may be encoded dependent on other pictures in a GOP, video encoder 106 may exploit the redundancy between pictures to achieve better compression in P- and B-frames than in I-frames. Thus, encoded I-frames are typically larger than encoded P- or B-frames. Because of the differing compression performance of I-frames, P-frames, and B-frames, as well as the content of the video itself, the bit rate of encoded video data may be highly variable. For example, the sequence of pictures in GOPs may be IBBPBBPBB. In this example, if the frame rate is 30 frames per second, IP packet bursts may be expected every 33 milliseconds, where every 270 milliseconds is an I-frame, which is reflected as a high data rate burst.

When video encoder 106 encodes a picture of a GOP, IP stack 108 may generate one or more IP packets that encapsulate the encoded picture. The IP packets may then be stored in L2 buffer 112. Physical layer 116 may read the IP packets from L2 buffer 112 and perform actions to transmit the IP packets, e.g., to wireless base station 104.

Figure 2:
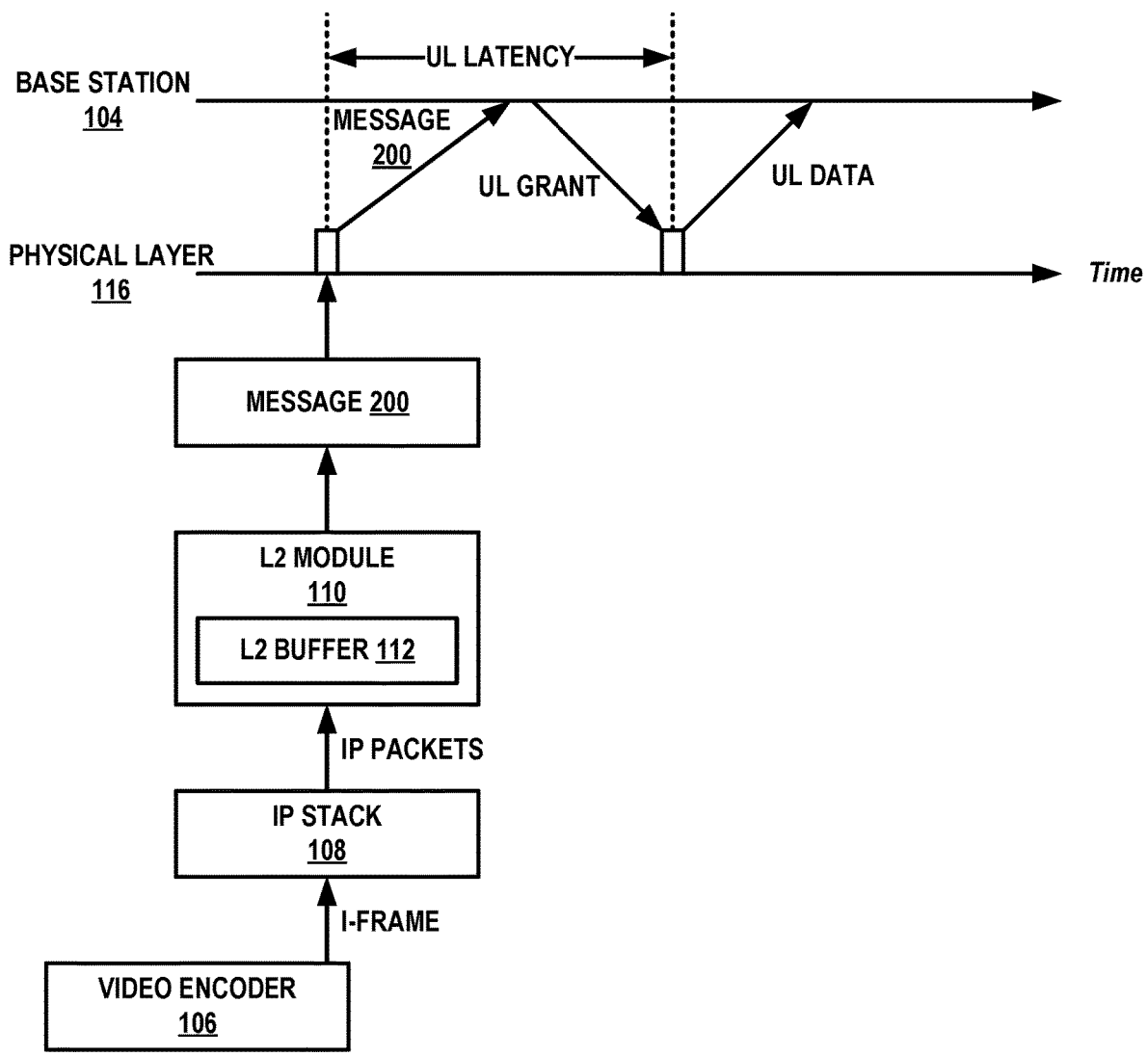
FIG. 2 is a conceptual diagram illustrating a conventional technique for transmitting encoded video data.

Conventionally, when IP packets are stored into L2 buffer 112, L2 module 110 generates a message 200. Physical layer 116 sends message 200 to wireless base station 104. Physical layer 116 then waits to receive a response from wireless base station 104. The response may indicate the time slots within which physical layer 116 may send the packets. In FIG. 2, the delay between when physical layer 116 sends message 200 and when physical layer 116 receives the response from wireless base station 104 is substantially equal to the uplink (UL) delay.

The conventional process of transmitting encoded video data is described with respect to FIG. 2. Specifically, FIG. 2 is a conceptual diagram illustrating a conventional technique for transmitting encoded video data. In FIG. 2, time progresses from left to right. As shown in FIG. 2, video encoder 106 may generate encoded pictures, such as an I-frame. IP stack 108 may then generate IP packets that encapsulate the encoded pictures, which are then stored in L2 buffer 112. In response to storage of the IP packets in L2 buffer 112, L2 module 110 generates a message 200, which is sent by physical layer 116 to base station 104. In response to message 200, base station 104 sends an UL grant to device 102. After receiving the UL grant, physical layer 116 may send UL data containing the IP packets to base station 104. FIG. 2 shows the UL latency between when the IP packets are stored in L2 buffer 112 and transmission of the IP packets.

The UL latency may be variable in length. The variability of the UL latency may contribute to jitter in a stream of encoded video data sent by device 102. This jitter may lead to buffer overflows or underflows or missing the time to display at a device receiving the stream of encoded video data. Such buffer overflows or underflows or missing the time of display may result in Quality of Experience degradation due to the lost pictures or delays in presenting pictures. In either case, a person viewing the video data on the receiving device may experience diminished video quality.

Accordingly, it may be desirable to reduce the UL latency. This disclosure describes techniques that may reduce the UL latency. For instance, in accordance with some techniques of this disclosure, video encoder 106 may generate an early video notification 118 (FIG. 1) prior to completing the process of encoding a GOP. For instance, video encoder 106 may generate the early video notification upon starting a process of encoding the video frame. The early video notification may include a size value that is based on an estimated size of the encoded versions of one or more pictures (e.g., the pictures in a GOP). In response to receiving early video notification 118, L2 module 110 generates a message, which is sent by physical layer 116 to wireless base station 104, e.g., in the manner described above. Video encoder 106 may complete the process of encoding the pictures while physical layer 116 is waiting to receive UL grant.

Figure 3:
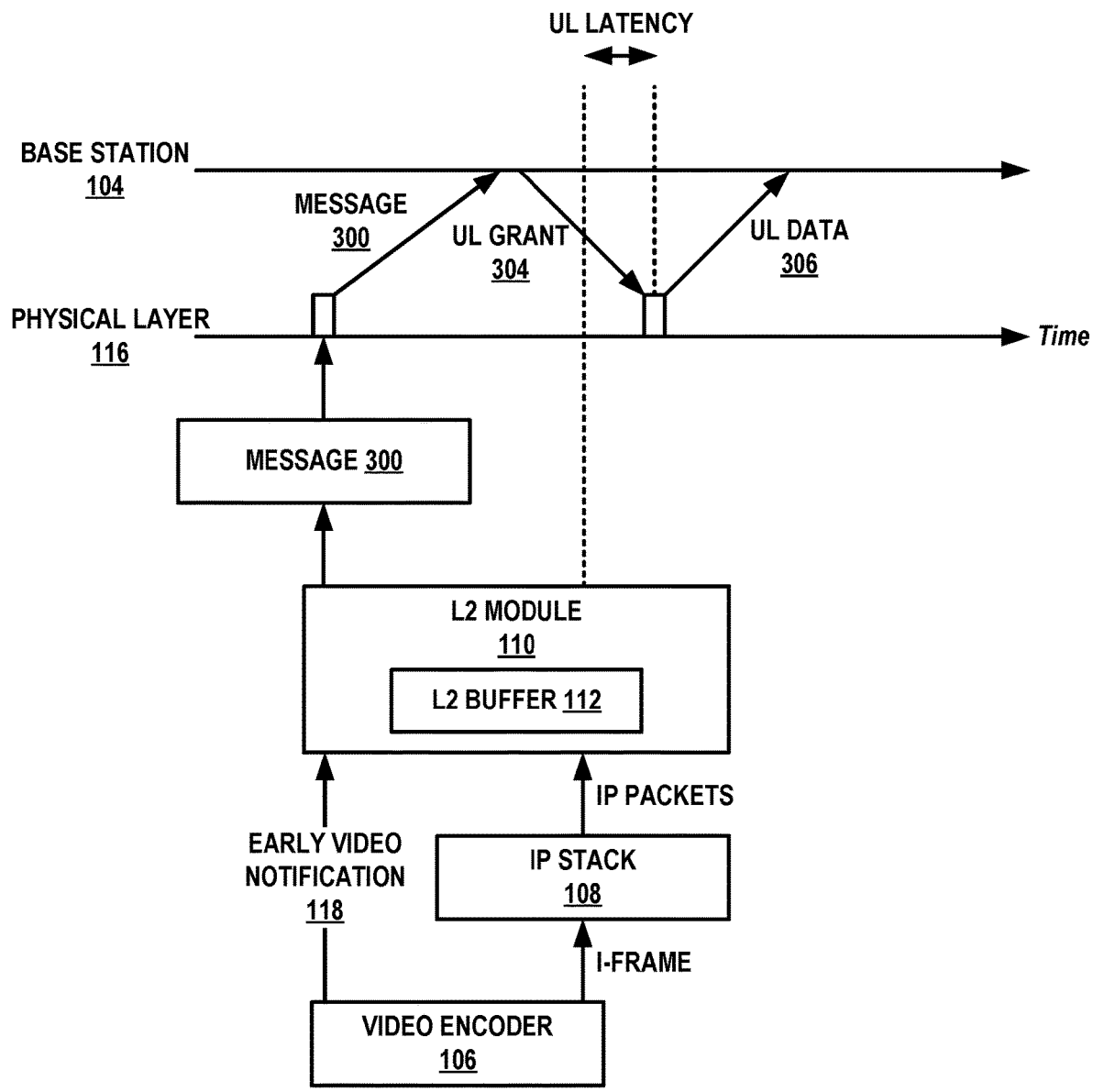
FIG. 3 is a conceptual diagram illustrating an example technique for transmitting encoded video data in accordance with one or more techniques of this disclosure.

FIG. 3 is a conceptual diagram illustrating an example technique for transmitting encoded video data in accordance with one or more techniques of this disclosure. In the example of FIG. 3, time progresses from left to right. As shown in the example of FIG. 3, video encoder 106 may generate an estimated size of encoded versions of one or more pictures of video data prior to generating the encoded versions of the one or more pictures. Additionally, video encoder 106 may generate an early video notification 118 to the L2 layer prior to generating the encoded versions of the one or more pictures. For instance, in some examples, video encoder 106 generates early video notification 118 before, after, or during encoding an I-frame at the beginning of a GOP.

Responsive to early video notification 118, L2 module 110 may send a message 300 which physical layer 116 sends to wireless base station 104. Message 300 may include an explicit or implicit request for resources (e.g., time slots, frequencies, etc.) to transmit data, such as encoded versions of one or more pictures. Message 300 may indicate a size value based on the estimated size of the encoded versions of the one or more pictures. In some examples, the size value may be equal to the estimated size of the encoded versions of the one or more pictures. In some examples, the size value may be equal to (or based on) a sum of the estimated size of the encoded versions of the one or more pictures plus an expected size of overhead data, such as packet headers, checksum bits, etc.

Physical layer 116 may receive an UL grant notification 304 in response to message 300. Based on UL grant notification 304, physical layer 116 may send to wireless base station 104, packets containing the encoded versions of the one or more pictures as UL data 306.

During the time between generation of early video notification 118 and the time when physical layer 116 receives UL grant notification 304, video encoder 106 may finish the process of generating the encoded versions of the one or more pictures, IP stack 108 may generate IP packets containing the encoded versions of the one or more pictures, and L2 buffer 112 may store the IP packets. Thus, in the example of FIG. 3, the UL latency (i.e., the time between when packets containing encoded video data are ready to be sent and the time when physical layer 116 is able to send the packets) may be reduced.

The various units and modules of FIG. 1 and FIG. 3 are illustrated to assist with understanding the operations performed by device 102. The units may be implemented as one or more processors that are implemented as fixed-function circuits, programmable circuits, or a combination thereof. Fixed-function circuits are circuits that provide particular functionality and are preset on the operations that can be performed. Programmable circuits are circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits. The units and modules may include arithmetic logic units (ALUs), elementary function units (EFUs), digital circuits, analog circuits, and/or programmable cores, formed from programmable circuits. In examples where the operations are performed using software executed by the programmable circuits, memory may store the object code of the software receives and executes.

Figure 4:
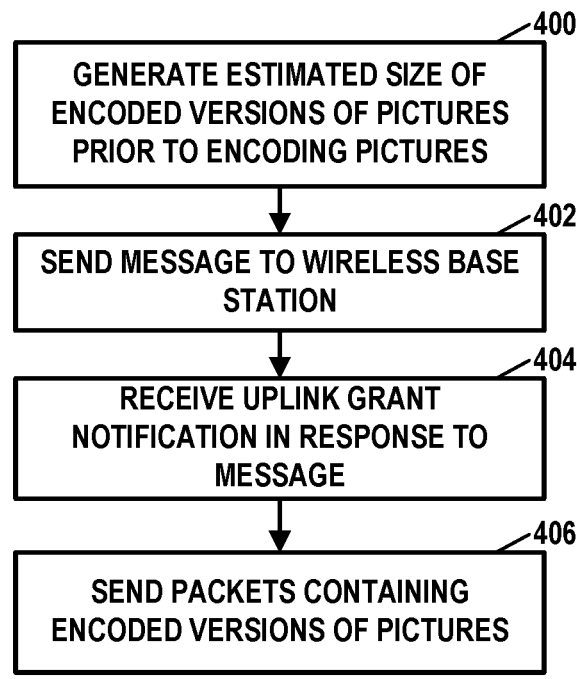
FIG. 4 is a flowchart illustrating an example method for transmitting encoded video data in accordance with one or more techniques of this disclosure.

FIG. 4 is a flowchart illustrating an example method for transmitting encoded video data in accordance with one or more techniques of this disclosure. In the example of FIG. 4, video encoder 106 may generate an estimated size of encoded versions of one or more pictures of video data prior to generating the encoded versions of the one or more pictures (400). In some examples, video encoder 106 may generate the estimated size of the encoded versions of the one or more pictures based on the size of encoded versions of one or more previous sets of pictures. For instance, the estimated size may be an average, weighted average, or the like, of the size of encoded versions of one or more previous sets of pictures. In some examples, video encoder 106 may generate the estimated size of the encoded versions of the one or more pictures based on one or more metrics, such as a metric of differences between the one or more pictures (which may be a heuristic to the size of encoded versions of P- and B-pictures).

Video encoder 106 may generate the estimated size of the encoded versions of the one or more pictures of the video data prior to video encoder 106 generating the encoded versions of the one or more pictures. For instance, in some examples, video encoder 106 may generate the estimated size of the encoded versions of the one or more pictures in response to a determination that an upcoming picture (e.g., next picture) of the one or more pictures is to be encoded as an I-frame. In some examples, a GOP includes the one or more pictures.

Furthermore, in the example of FIG. 4, physical layer 116 may send a message to wireless base station 104 (402). The message indicates a size value based on the estimated size of the encoded versions of the one or more pictures. In some examples, video encoder 106 may generate a notification prior to generating the encoded versions of the one or more pictures. Responsive to the notification, the L2 layer (e.g., L2 module 110) may send a message to physical layer 116. Physical layer 116 is configured to send the message to wireless base station 104 responsive to receiving the message from L2 module 110.

Physical layer 116 may receive an UL grant notification in response to the message (404). The UL grant notification may indicate time slots and/or other resources that device 102 may use to transmit packets containing the encoded versions of the one or more pictures. In examples where the UL grant notification indicates time slots, the number of time slots may be based on the size value. In some examples, video encoder 106 may generate the encoded versions of the one or more pictures during a time between generating the notification (e.g., a notification to L2 module 110) and receiving the uplink grant notification. Furthermore, IP stack 108 may generate the packets (e.g., by adding an IP header, filler data, etc.) and L2 buffer 112 may store the packets. Physical layer 116 may send, to wireless base station 104, the packets from the buffer of the L2 layer (i.e., L2 buffer 112).

Based on the UL grant notification, physical layer 116 may send, to wireless base station 104, packets containing the encoded versions of the one or more pictures (406). For instance, physical layer 116 may send the packets during time slots indicated by the UL grant notification. In some examples, the method of FIG. 4, including sending the packets, is performed as part of a real time video streaming session, such as a video conferencing session.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method of transmitting encoded video data, the method comprising:
    generating an estimated size of an encoded version of one or more pictures of video data prior to generating the encoded version of the one or more pictures;
    sending, by a physical layer of a radio system, a message to a wireless base station, wherein the message indicates a size value based on the estimated size of the encoded version of the one or more pictures;
    receiving, by the physical layer of the radio system, an uplink grant notification in response to the message; and
    based on the uplink grant notification, sending, by the physical layer of the radio system to the wireless base station, packets containing the encoded version of the one or more pictures.

2. The method of claim 1, further comprising:
    generating, with a video encoder, a notification to a Layer 2 module of the radio system, prior to the video encoder generating the encoded version of the one or more pictures; and
    responsive to the notification, sending, by the Layer 2 module of the radio system, the message to the physical layer of the radio system,
    wherein sending, by the physical layer of the radio system, the message to the wireless base station comprises sending, by the physical layer of the radio system, the message to the wireless base station responsive to receiving the message from the Layer 2 module of the radio system.

3. The method of claim 2, further comprising:
    generating the packets; and
    storing the packets in a buffer of the L2 layer,
    wherein sending the packets containing the encoded version of the one or more pictures comprises sending, by the physical layer of the radio system to the wireless base station, the packets from the buffer of the L2 layer.

4. The method of claim 2, further comprising generating the encoded version of the one or more pictures during a time between generating the notification and receiving the uplink grant notification.

5. The method of claim 4, wherein generating the estimated size of the encoded version of the one or more pictures of the video data comprises generating, by a video encoder, the estimated size of the encoded version of the one or more pictures of the video data prior to the video encoder generating the encoded version of the one or more pictures.

6. The method of claim 1, wherein generating the estimated size of the encoded version of the one or more pictures comprises generating the estimated size of the encoded version of the one or more pictures in response to a determination that an upcoming picture of the one or more pictures is to be encoded as an I-frame.

7. The method of claim 6, wherein a group of pictures (GOP) includes the one or more pictures.

8. A device comprising:
    one or more processors implemented in circuitry, the one or more processors configured to generate an estimated size of an encoded version of one or more pictures of video data prior to generating the encoded version of the one or more pictures; and
    a radio system that comprises a physical layer configured to:
        send a message to a wireless base station, wherein the message indicates a size value based on the estimated size of the encoded version of the one or more pictures;
        receive an uplink grant notification in response to the message; and
        based on the uplink grant notification, send, to the wireless base station, packets containing the encoded version of the one or more pictures.

9. The device of claim 8, wherein:
    the radio system further comprises a Layer 2 module,
    the one or more processors are further configured to generate, with a video encoder implemented by the one or more processors, a notification to a Layer 2 module of the radio system, prior to the video encoder generating the encoded version of the one or more pictures,
    the Layer 2 module of the radio system is configured to send, responsive to the notification, the message to the physical layer of the radio system, and
    the physical layer of the radio system is configured to send the message to the wireless base station responsive to receiving the message.

10. The device of claim 9, wherein:
    the device comprises a buffer,
    the one or more processors are further configured to:
        generate the packets; and
        store the packets in the buffer, and
    the physical layer of the radio system is configured to send, to the wireless base station, the packets from the buffer.

11. The device of claim 9, wherein the one or more processors are further configured to generate the encoded version of the one or more pictures during a time between generating the notification and receiving the uplink grant notification.

12. The device of claim 11, wherein the one or more processors are configured to generate the estimated size of the encoded version of the one or more pictures of the video data prior to generating the encoded version of the one or more pictures.

13. The device of claim 9, wherein the one or more processors are configured to generate the estimated size of the encoded version of the one or more pictures based on a determination that an upcoming picture of the one or more pictures is to be encoded as an I-frame.

14. The device of claim 13, wherein a group of pictures (GOP) includes the one or more pictures.

15. A non-transitory computer-readable storage medium having stored thereon instructions that, when executed, configure a processor to:
  generate an estimated size of an encoded version of one or more pictures of video data prior to generating the encoded version of the one or more pictures; and
  configure a physical layer of a radio system to:
    send a message to a wireless base station, wherein the message indicates a size value based on the estimated size of the encoded version of the one or more pictures;
    receive an uplink grant notification in response to the message; and
    based on the uplink grant notification, send packets containing the encoded version of the one or more pictures.

16. The non-transitory computer-readable storage medium of claim 15, wherein the instructions configure the processor to:
  generate, with a video encoder, a notification to a Layer 2 module of the radio system, prior to the video encoder generating the encoded version of the one or more pictures; and
  responsive to the notification, send, with the Layer 2 module of the radio system, the message to the physical layer of the radio system,
  wherein the instructions configure to the physical layer of the radio system to send the message to the wireless base station responsive to receiving the message.

17. The non-transitory computer-readable storage medium of claim 16, wherein the instructions configure the processor to:
  generate the packets; and
  store the packets in a buffer of the L2 layer,
  wherein the instructions configure the physical layer of the radio system to send, to the wireless base station, the packets from the buffer of the L2 layer.

18. The non-transitory computer-readable storage medium of claim 16, wherein the instructions configure the processor to generate the encoded version of the one or more pictures during a time between generating the notification and receiving the uplink grant notification.

19. A device for transmitting encoded video data, the device comprising:
  means for generating an estimated size of an encoded version of one or more pictures of video data prior to generating the encoded version of the one or more pictures;
  means for sending a message to a wireless base station, wherein the message indicates a size value based on the estimated size of the encoded version of the one or more pictures;
  means for receiving an uplink grant notification in response to the message; and
  means for sending, based on the uplink grant notification, packets containing the encoded version of the one or more pictures.

20. The device of claim 19, further comprising:
  means for generating the packets; and
  means for storing the packets.

21. The device of claim 19, further comprising means for generating the encoded version of the one or more pictures during a time between generating the notification and receiving the uplink grant notification.

22. The device of claim 21, wherein the means for generating the estimated size of the encoded version of the one or more pictures of the video data comprises means for generating the estimated size of the encoded version of the one or more pictures of the video data prior to generating the encoded version of the one or more pictures.

\* \* \* \* \*